(12) United States Patent
Drabarek et al.

(10) Patent No.: US 7,518,729 B2
(45) Date of Patent: Apr. 14, 2009

(54) INTERFEROMETRIC MEASURING DEVICE

(75) Inventors: Pawel Drabarek, Tiefenbronn (DE); Stefan Franz, Jena (DE); Matthias Fleischer, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 59 days.

(21) Appl. No.: 11/731,052

(22) Filed: Mar. 30, 2007

(65) Prior Publication Data

US 2007/0229840 A1 Oct. 4, 2007

(30) Foreign Application Priority Data

Mar. 30, 2006 (DE) .................. 10 2006 014 766

(51) Int. Cl.
*G01B 9/02* (2006.01)

(52) U.S. Cl. ....................................... 356/479

(58) Field of Classification Search ............... 356/73.1, 356/450, 477, 479, 497; 250/227.19, 227.27; 385/12

See application file for complete search history.

(56) References Cited

U.S. PATENT DOCUMENTS 4,596,466 A * 6/1986 Ulrich .......................... 356/497
5,227,857 A * 7/1993 Kersey ......................... 356/477
6,606,158 B2 * 8/2003 Rosenfeldt et al. ........... 356/477
7,400,408 B2 * 7/2008 Drabarek et al. ............. 356/497
2003/0160965 A1 * 8/2003 Lindner ....................... 356/497

FOREIGN PATENT DOCUMENTS

DE 198 08 273 9/1999

* cited by examiner

*Primary Examiner*—Michael A Lyons
(74) *Attorney, Agent, or Firm*—Kenyon & Kenyon LLP

(57) ABSTRACT

An interferometric measuring device includes a short-coherent radiation source and a system composed of a modulation interferometer having a first and a second modulation interferometer beam path and a downstream reference interferometer, the radiation being split in the reference interferometer into a first beam path and a second beam path. If a dispersive optical component is situated in at least one beam path of the reference interferometer, a different optical path length becomes effective for radiation of a different wavelength in the beam path having the dispersive optical component. Therefore, if one measuring probe is replaced with another one having a modified optical path length, the modulation interferometer may be adjusted and the reference interferometer may remain unchanged. The reference interferometer may thus be used over an extended adjustment path of the modulation interferometer without optical components having to be replaced for adjusting the different path difference of measuring probes in the reference interferometer.

6 Claims, 2 Drawing Sheets

INTERFEROMETRIC MEASURING DEVICE

FIELD OF THE INVENTION

The present invention relates to an interferometric measuring device having a Short-coherent radiation source and a system composed of a modulation interferometer having a first and a second modulation interferometer beam path and a downstream reference interferometer, the radiation being split in the reference interferometer into a first beam path and a second beam path.

BACKGROUND INFORMATION

Interferometric measuring devices having a modulation interferometer and a downstream reference interferometer are used for optical distance measurement, for example, in quality assurance when measuring surface geometries. German Patent No. DE 198 08 273 describes such an interferometric measuring device for detecting the shape or distance in particular of rough surfaces, having at least one spatially coherent beam generating unit whose radiation is split, in a measuring probe, into a reference measuring beam conducted through a reference measuring branch and reflected therein, and a measuring beam conducted through a measuring branch and reflected on the rough surface, having a device for modulating the light phase or for shifting the light frequency (heterodyne frequency) of a first partial beam with respect to the light phase or the light frequency of a second partial beam, having a superimposition unit for superimposing the reflected measuring reference beam on the reflected measuring beam, having a beam decomposition and beam receiving unit for splitting the superimposed radiation into at least two beams having different wavelengths and for converting the radiation into electric signals, and having an analyzer unit in which the shape and/or distance of the rough surface is determinable on the basis of a phase difference of the electric signals. The radiation emitted by the beam generating unit is short-coherent in time and broad-band.

Such interferometric measuring devices initially composed of two interferometers may be constructed using different interferometer types. The modulation interferometer may thus be designed as a Mach-Zehnder interferometer, while the measuring interferometer or the measuring probe may be designed as a compact interferometer, for example, a Mirau interferometer. The interferometric measuring devices share the feature that the path difference between two partial beams, established in the first interferometer, is equalized again by a short-coherent radiations source in the second measuring interferometer or measuring probe and the partial beams are thus brought to interference. The path difference established by a delay element in German Patent No. DE 198 08 273 may also be produced by partial arms of different lengths, through which the partial beams pass, as in a modulation interferometer having optical fibers described in German Patent No. DE 198 08 273.

In order to improve the measuring accuracy of the interferometric measuring device, it is known to connect a reference interferometer to a second output of the modulation interferometer. The reference interferometer has an optical design like that of the measuring interferometer, i.e., it again equalizes the path difference between the two partial beams established in the modulation interferometer. However, the design of the reference interferometer differs from that of the measuring interferometer. The measuring accuracy of the interferometric measuring device may be improved by comparing the signals of the reference interferometer with those of the measuring interferometer.

The path difference to be established in the modulation interferometer depends on the design of the measuring interferometer or the measuring probe. After a replacement of the measuring interferometer/measuring probe, the path difference in the modulation interferometer must be adjusted. This is usually accomplished motively by shifting optical components.

The path difference must be adjusted accordingly also in the reference interferometer. In this case the path difference is typically adjusted by replacement of a pre-adjusted unit. The disadvantage here is that units adjusted to the measuring interferometer used must be available. The replacement of units is complicated.

An object of the present invention is to provide a device of the above-mentioned type which avoids the aforementioned disadvantages and makes a replacement of measuring probes possible using less adjustment of the reference interferometer.

SUMMARY OF THE INVENTION

The object of the present invention is achieved by situating a dispersive optical component in at least one beam path of the reference interferometer. Due to the dispersive optical element, a different optical path length becomes effective for radiations of different wavelengths in the beam path having the dispersive optical element. Therefore, if one measuring probe is replaced with another one having a modified optical path length, the modulation interferometer may be adjusted and the reference interferometer may remain unchanged. The reference interferometer may thus be used over an extended adjustment path of the modulation interferometer without optical components having to be replaced for adjusting the different path difference of measuring probes in the reference interferometer. The condition of interference is met only in the case of a different wavelength of the radiation. The use of the dispersive optical component increases the signal intensity of the system compared to a system having an interference filter. Factor n of the increase of the signal intensity of the system according to the present invention results from the ratio of the wavelength ranges used by the system having the dispersive optical component and having the interference filter. The coherence condition is met if the path difference is less than the coherence length $I_{C,probe}$ of the wavelength range used. Using the dispersive optical component, the overall spectrum is distributed over length $I_{CHF}$ of the coherence function. The wavelength range used is therefore less by the factor $$n = I_{CHF}/I_{C,probe} \tag{1}$$

than the overall spectrum. The coherence length of the wavelength range used is greater by the same factor:

$$I_{C,probe} = n \cdot I_{C,radiation\ source} = I_{CHF}/I_{C,probe} \cdot I_{C,radiation\ source} \tag{2}$$

where $I_{C,radiation}$ source is the coherence length of the radiation source. Therefore, the following equation applies:

$$I_{C,probe} = (I_{CHF} \cdot I_{C,radiation\ source})^{0.5} \tag{3}$$

From (1) and (3) we have:

$$n = (I_{CHF}/I_{C,radiation\ source})^{0.5} \tag{4}$$

for the wavelength range used. Whence:

$$n = (n_{IF})^{0.5}, \text{ where } n_{IF} = I_{C,filter}/I_{C,radiation\ source} \quad (5)$$

where $I_{C,filter}$ is the coherence length, using an interference filter.

The wavelength range used and the signal intensity are therefore $(n_{IF})^{0.5}$ times greater when using a dispersive optical component than it is when using an interference filter.

In a particularly cost-effective specific embodiment, the dispersive optical component is designed as a chirped fiber Bragg grating. The use of a chirped fiber Bragg grating also has the advantage that the shape and wavelength range of the coherence function are selectable.

If the dispersive optical component is designed as a transparent amorphous or crystalline solid, the desired dispersive split may be achieved in a simple and cost-effective way via the length of the component and the dispersion properties. If the dispersive optical component is made of glass, the dispersion property may be selected in a broad range from commercially available materials which are available in a narrowly defined quality. High-dispersion glass is available as a material, so that the shape of the dispersive optical component may be selected for compactness.

Another specific embodiment provides that the dispersive optical component is designed as a grating or as a prism. Screens or prisms may be manufactured with high precision using known methods and devices and are therefore manufacturable in a cost-effective way.

If the reference interferometer is designed as an interferometric measuring system for an adjusting unit of the modulation interferometer, the path difference may be adjusted by adjusting the modulation interferometer in a broad range to different measuring probes, and the reference interferometer may be used over the entire adjustment path because the replacement of optical components in the reference interferometer, required according to the related art and meaning the restart of the reference measurement, is not necessary.

DETAILED DESCRIPTION

Figure 1:
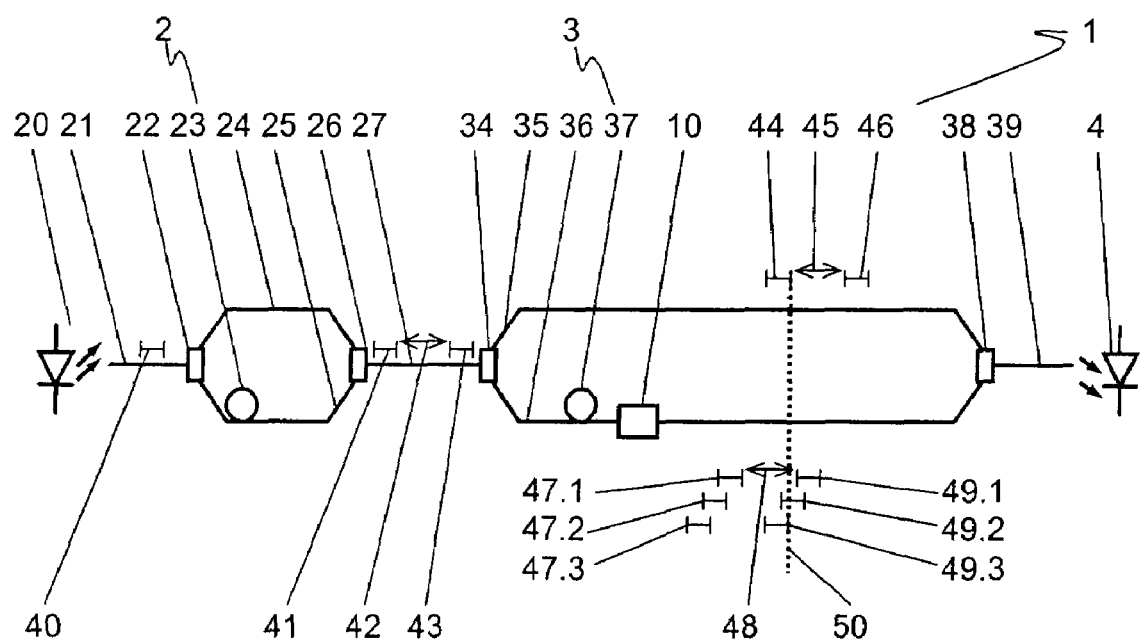
FIG. 1 shows an interferometric measuring device constructed using fiber-optic components.

FIG. 1 schematically shows an interferometric measuring device 1, constructed using fiber-optic components, having a modulation interferometer 2, a reference interferometer 3, and a detector 4. Modulation interferometer 2 has a radiation source 20 for short-coherent radiation, whose radiation having a coherence length 40 is injected into a first optical fiber 21. In a first fiber coupler 22 connected to first optical fiber 21, the radiation is split into a first modulation interferometer beam path 24 and a second modulation interferometer beam path 25. In second modulation interferometer beam path 25, the radiation passes through a first delay element 23, so that no interference occurs at a second fiber coupler 26 connected to first modulation interferometer beam path 24 and second modulation interferometer beam path 25. In a second optical fiber 27 connected to second fiber coupler 26, a coherence range of undelayed radiation 43 is therefore separated from a coherence range of delayed radiation 41 by a separation of wave packets 42.

Second optical fiber 27 is connected to a third fiber coupler 34, which is part of reference interferometer 3. The radiation is split into a first beam path 35 and a second beam path 36 at third fiber coupler 34. In first beam path 35, the radiation has a first coherence range 46. A second coherence range 44 of the delayed beam is downstream from first coherence range 46 at a separation of the wave packets in undelayed branch 45, which is equal to the separation of wave packets 42.

In second beam path 36, the radiation passes through a delay element 37 and then a dispersive optical component 10. Delay element 37 at least partially compensates for the separation of wave packets 42 between the delayed and undelayed radiation. Due to dispersive optical component 10, radiation of different wavelengths passes through different optical path lengths. The undelayed radiation is therefore split into a first coherence range at a first wavelength 49.1, into a first coherence range at a second wavelength 49.2 and into a first coherence range at a third wavelength 49.3. This illustration is only schematic; in a real system having a radiation of a certain range of wavelengths, however, a coherence range may be assigned to each individual wavelength.

Like the undelayed radiation, the delayed radiation is also split into a second coherence range at a first wavelength 47.1, into a second coherence range at a second wavelength 47.2 and a second coherence range at a third wavelength 47.3. At the same wavelength, delayed and undelayed radiations have a separation of the wave packets in delayed branch 48 equal to the separation of the wave packets in undelayed branch 45. First beam path 35 and second beam path 36 are combined at a fourth fiber coupler 38 from which the radiation is conducted further in a third optical fiber 39 by which it is supplied to a detector 4. In third optical fiber 39, the partial beams from first beam path 35 and second beam path 36 interfere if they meet a coherence condition 50, which schematically indicates that the partial beams have traveled the same optical path lengths from radiation source 20. According to the conditions depicted in FIG. 1, delayed radiation from first beam path 35, which corresponds to second coherence range 44, may interfere with undelayed radiation which corresponds to the first coherence range at second wavelength 49.2 from second beam path 36. This interference is detected in detector 4.

If the separation of wave packets 42 is set to another value using delay element 23, coherence condition 50 may still be met at a wavelength that is different from that in the case shown because coherence occurs in the entire wavelength range including coherence ranges 49.1, 49.2, and 49.3. It is assumed here that first coherence ranges 49.1, 49.2, and 49.3 represent the range of wavelengths emitted by radiation source 20.

Figure 2:
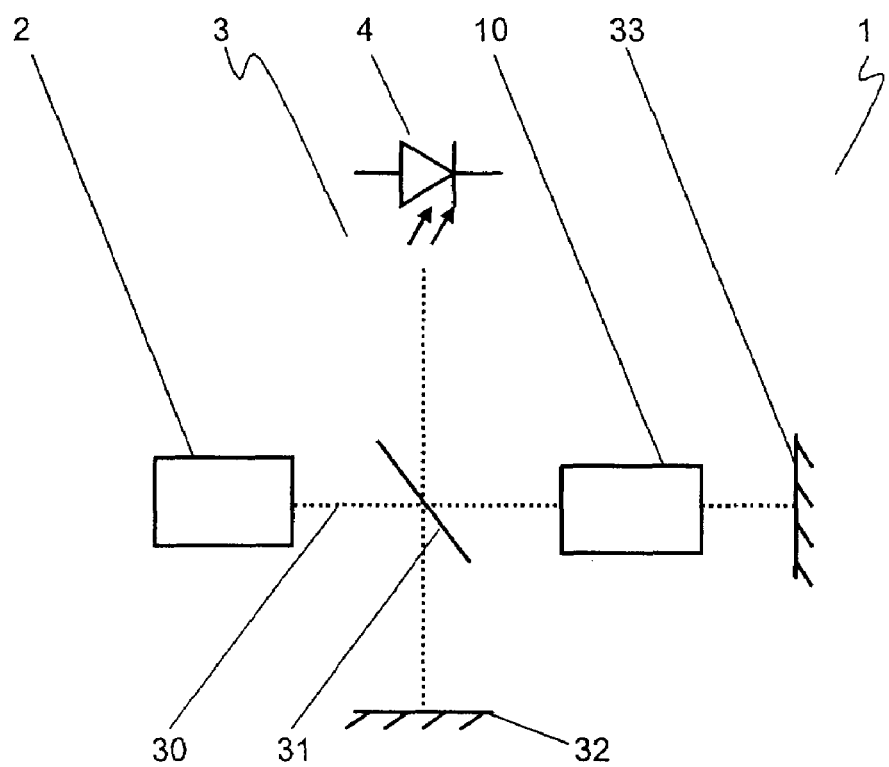
FIG. 2 schematically shows an interferometric measuring device.

FIG. 2 shows another specific embodiment of interferometric measuring device 1 having modulation interferometer 2 and reference interferometer 3. A first portion of radiation 30 is supplied from modulation interferometer 2 to a first reflector 32 via semitransparent reflector 31. The radiation is supplied from first reflector 32 through semitransparent reflector 31 to detector 4. Another portion of radiation 30 is supplied, via dispersive optical component 10, to a second reflector 33, from where it is conducted back to detector 4 through dispersive optical component 10 via semitransparent reflector 31 to interfere with the first portion of the radiation. Also in this exemplary embodiment, dispersive optical component 10 causes radiation 30 from modulation interferometer 2 to meet the coherence condition in a greater range of separations between delayed and undelayed radiations. Dispersive optical component 10 may be manufactured of glass and the different refractive index of glass may be used for different wavelengths. In an advantageous embodiment, a highly dispersive glass is used, so that dispersive optical component 10 may have a compact design. Dispersive optical component 10 may also be designed as a prism which for different wavelengths uses different refracting angles and thus different path lengths in the prism. Dispersive component 10 may also be designed as a grating, which deflects radiation of different wavelengths in different directions and thus differentiates the path lengths in the optical system.

Figure 3:
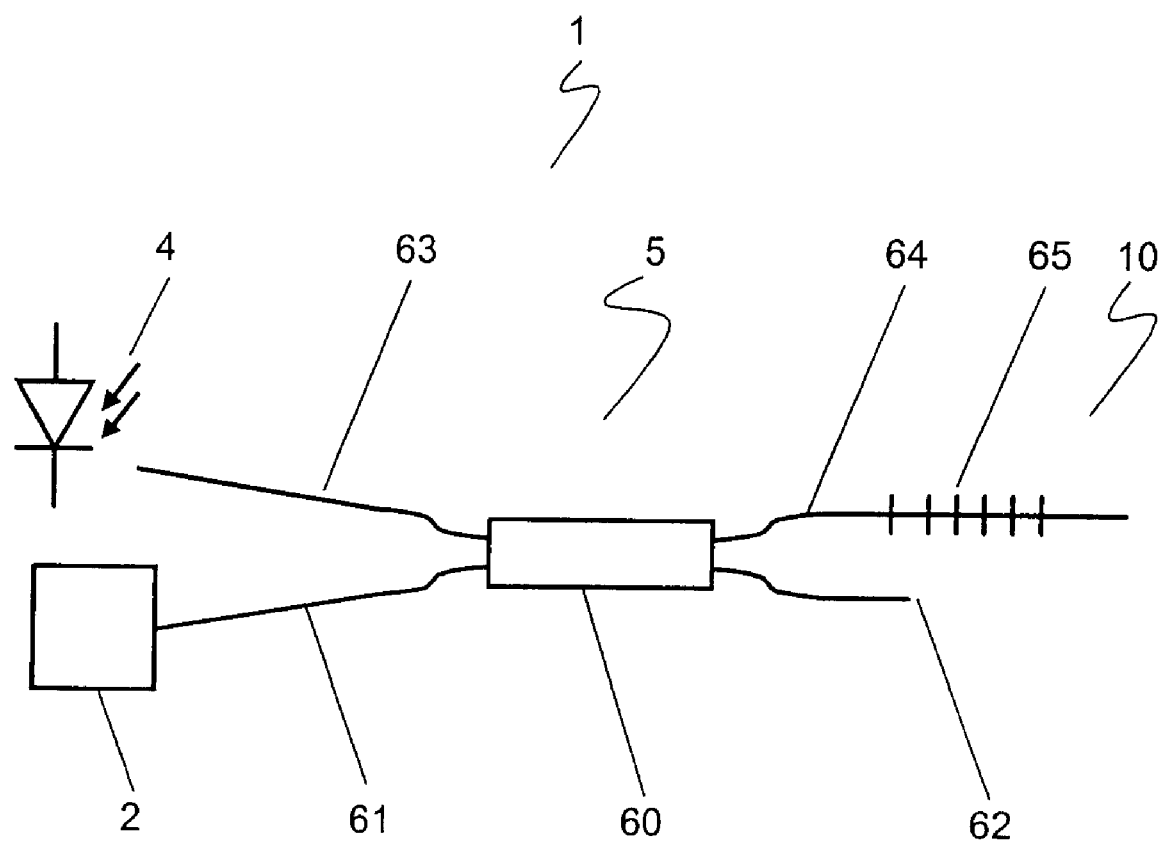
FIG. 3 shows an interferometric measuring device having a chirped fiber Bragg grating.

FIG. 3 shows a specific embodiment of interferometric measuring device 1 having modulation interferometer 2 and a reference probe 5 designed as a Michelson interferometer, in which dispersive optical component 10 is designed as a chirped fiber Bragg grating 65. The radiation is supplied from modulation interferometer 2 to a first reference probe fiber coupler 60 with the aid of a first reference probe optical fiber 61, by which it is split into an optical fiber having metallized end 62 and a third reference probe optical fiber 64. The radiation is reflected by the optical fiber having metallized end 62, and supplied to detector 4 via reference probe fiber coupler 60 and a second reference probe optical fiber 63. The radiation entering reference probe optical fiber 64 is conducted further to chirped fiber Bragg grating 65, in which the radiation of different wavelengths is reflected according to different path lengths, so that radiation of different wavelengths is conducted back along third reference probe optical fiber 64 according to different path lengths. Chirped fiber Bragg grating 65 thus functions as a dispersive optical component 10. From third reference probe optical fiber 64, the radiation is conducted, via reference probe fiber coupler 60 and second reference probe optical fiber 63, to detector 4, where it interferes with the radiation reflected on the optical fiber having metallized end 62. In this exemplary embodiment, chirped fiber Bragg grating 65 causes the radiation from modulation interferometer 2 to meet the coherence condition in a greater range of separations between delayed and undelayed radiations.

What is claimed is:

1. An interferometric measuring device comprising:
   a short-coherent radiation source;
   a system composed of a modulation interferometer having a first and a second modulation interferometer beam path and a downstream reference interferometer, radiation being split in the reference interferometer into a first reference beam having a first beam path and a second reference beam having a second beam path; and
   a dispersive optical component situated in at least one of the first and second beam paths of the reference interferometer, the dispersive optical component configured to split at least one of the first and second reference beams such that the at least one of the first and second reference beams has a plurality of coherence ranges, each of the plurality of coherence ranges corresponding to a respective wavelength.

2. The device according to claim 1, wherein the dispersive optical component includes a chirped fiber Bragg grating.

3. The device according to claim 1, wherein the dispersive optical component includes at least one of a transparent amorphous and crystalline solid.

4. The device according to claim 1, wherein the dispersive optical component includes at least one of a grating and a prism.

5. The device according to claim 1, wherein the reference interferometer is an interferometric measuring system for an adjusting unit of the modulation interferometer.

6. The device according to claim 1, wherein the device is adapted to accommodate different measuring probes without replacement of optical components of the reference probe.

* * * * *